United States Patent
Okano (10) Patent No.: US 6,215,590 B1
(45) Date of Patent: Apr. 10, 2001

(54) STEREOSCOPIC IMAGE DISPLAY APPARATUS

(75) Inventor: Hideaki Okano, Kanagawa-ken (JP)

(73) Assignee: Kabushiki Kaisha Toshiba, Kanagawa-ken (JP)

(*) Notice: Subject to any disclaimer, the term of this patent is extended or adjusted under 35 U.S.C. 154(b) by 0 days.

(21) Appl. No.: 09/246,696

(22) Filed: Feb. 9, 1999

(30) Foreign Application Priority Data

Feb. 9, 1998 (JP) .................................................. 10-027389

(51) Int. Cl.⁷ .......................... G02B 27/22; H04N 13/04; H04N 15/00
(52) U.S. Cl. ........................ 359/464; 359/462; 348/55; 348/54; 348/56
(58) Field of Search ................................ 359/462, 463, 359/464, 466; 348/56, 58, 59, 57

(56) References Cited

U.S. PATENT DOCUMENTS

| | | | |
|---|---|---|---|
| 5,036,385 | * 7/1991 | Eichenlaub | 358/3 |
| 5,132,839 | * 7/1992 | Travis | 359/462 |
| 5,311,220 | * 5/1994 | Eichenlaub | 348/55 |
| 5,465,175 | * 11/1995 | Woodgate et al. | 359/462 |

FOREIGN PATENT DOCUMENTS

| | | |
|---|---|---|
| 5-244643 | 9/1993 | (JP) . |
| 7013105 | 1/1995 | (JP) . |

\* cited by examiner

*Primary Examiner*—Audrey Chang
(74) *Attorney, Agent, or Firm*—Pillsbury Madison & Sutro LLP (57) ABSTRACT

A stereoscopic image display apparatus having a light source that defines at least one right and left light-cells which provide plural pairs of right and left lights. A spatial modulator, spaced apart from the light source, spatially modulates the right and left lights from the light source so as to focus the right and left lights on the eyes of at least one viewer. A display mode changer is capable of automatically changing the display mode of the image display between a stereoscopic image display mode and a normal plane image display mode. The display is automatically changed in accordance with the location of the viewer or in response to an instruction from the viewer.

11 Claims, 5 Drawing Sheets

FIG. 7a — 3D IMAGE DISPLAY MODE

FIG. 7b — 2D IMAGE DISPLAY MODE

STEREOSCOPIC IMAGE DISPLAY APPARATUS

FILED OF THE INVENTION

The present invention relates to the viewer following style of stereoscopic image display apparatus, more particularly to the stereoscopic image display apparatus capable of presenting a stereoscopic image based on a parallax of the eyes of the viewers.

BACKGROUND OF THE INVENTION

Figure 10:
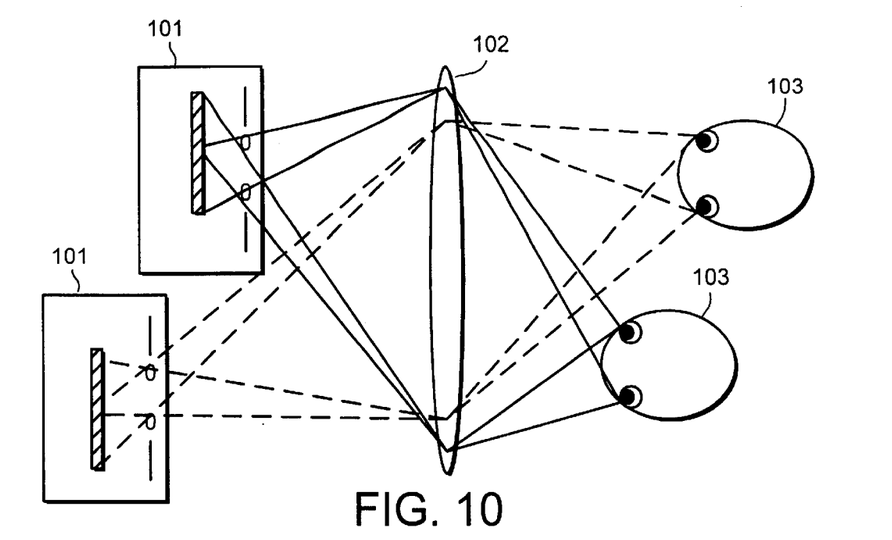
FIG. 10 is a schematic diagram showing one example of the conventional stereoscopic image display apparatus.

FIG. 10 is a schematic diagram for explaining a conventional stereoscopic image display apparatus as disclosed in the Japanese Patent Application; Tokkai-Hei 5-244643.

The stereoscopic image display apparatus is provided with a display unit 101 of the movable video projector having two optical systems for projecting the parallax image, and the large-diameter convex lens 102 for focusing the projected image on each right and left eyes of the viewer.

In this apparatus, by provided with the convex lens 102 between the display unit 101 providing a pair of the movable projector which is able to project the stereoscopic image and the viewer 103, it distributes the stereoscopic image to both eyes of the viewer. Then, the optical sensor (not shown) provided near the display unit 101 captures the position of the viewer 103, so that the display unit 101 moves mechanically to focus the image on the eyes of the viewer 103.

However, in the conventional stereoscopic image display apparatus there is a drawback explained below. Though the stereoscopic image display apparatus moves in accordance with the movement of the viewer, the stereoscopic image is not captured by both eyes of the viewer 103 when viewer's is head is not horizontal, so that when he/she tilts his/her head to the screen he/she can not observe the image.

Figure 11:
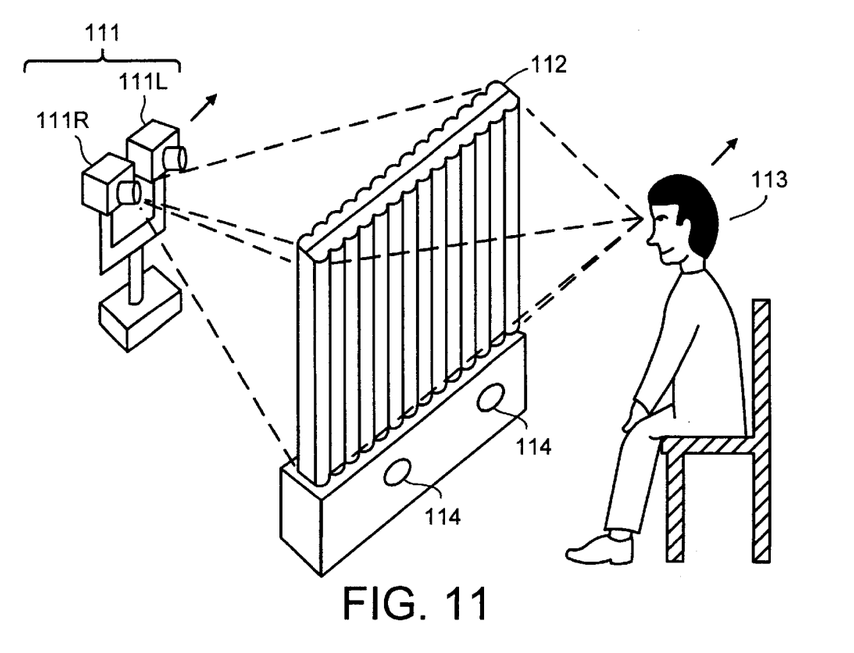
FIG. 11 is a schematic diagram showing another example of the conventional stereoscopic image display apparatus in the state providing a stereoscopic view to a viewer.

FIG. 11 is a conceptual diagram showing another conventional stereoscopic image display apparatus as disclosed in the Japanese Patent Application, Tokkai-Hei 7-13105. The stereoscopic image display apparatus comprises a screen 112 comprised of a diffuse transmission layer and two lenticular lenses sandwiching the layer, and a movable stereoscopic image projector 111 comprised of a right image projector 111R and a left image projector 111L.

The apparatus is provided with the stereoscopic instrumentation unit 114, which determines the perspective and the positions of both eyes of the viewer 113, and making the projector 111 track the movement of the viewer 113. Thus the viewer 113 circumvents constraints of his/her position. Further, since the right and left image projectors 111R, 111L are each independently movable, it enhances the degree of flexibility of the posture of the viewer.

When the viewer tilts his/her head, the conventional stereoscopic image display apparatus as described above tracks the tilt by shifting the right and left image projectors 111R, 111L in the vertical direction. However, in general the stereoscopic image contains only information of parallax between views of the left and right eyes. So that, the more the viewer tilts his/her head, the more the fusion of the stereoscopic image and the stereoscopic view will become difficult.

As described above, in the conventional stereoscopic image display apparatus, the projector moves in tracking movements of a viewer so that the right image is always captured by his/her right eye, and the left image is always captured by his/her left eye. However, the conventional stereoscopic image display apparatus can not track the tilting of the viewer's head. Provided if it could track the tilting, not only it actually fails to provide the viewer with any stereoscopic views, but also it fails to correctly fuse right images and left images with each other, thus viewers observe a double image.

SUMMARY OF THE INVENTION

The present invention is addressed to overcome the problems as described above. Thus it is an object of the present invention to provide a stereoscopic image display apparatus which is capable of changing the display mode between a stereoscopic image display and a normal plane image display when it is hard to present a stereoscopic view of images to viewer due to their postures. Another object of the present invention is to provide a stereoscopic image display apparatus which is capable of simultaneously presenting a stereoscopic image display for one viewer and a normal plane image display for another viewer.

In order to achieve the above object, a stereoscopic image display apparatus according to one aspect of the present invention includes a light source defined a light-cells for providing plural pairs of right and left lights, a spatial modulator for spatially modulating the right and left lights from the light source so as to focus the right and left lights on eyes of a plurality of viewers, and a display mode changer for changing a display mode between a stereoscopic image display mode an a normal plane image display mode in accordance with location of the viewers.

A stereoscopic image display apparatus according to another aspect of the present invention includes a light source defined a light-cells for providing plural pairs of right and left lights, a spatial modulator for spatially modulating the right and left lights from the light source so as to focus the right and left lights on eyes of a plurality of viewers, a display mode changer for changing a display mode between a stereoscopic image display mode and a normal plane image display mode in accordance with locations the viewers, and a lighting controller for controlling the right and left light-cells to alternately light with each other in synchronism with the alternating lighting of the right and left lights when the display mode changer selects the stereoscopic image display mode and to simultaneously light with each other for displaying either one of the right and left images when the display mode changer selects the normal plane image display.

A stereoscopic image display apparatus according to still another aspect of the present invention includes a light source defined as light-cells for providing plural pairs of right and left lights, a first spatial modulator for spatially modulating the right light from the light source so as to focus the right light on right eyes of a plurality of viewers and a second spatial modulator for spatially modulating the left light from the light source so as to focus the left light on left eyes of a plurality of viewers, a display mode changer for changing a display mode between a stereoscopic image display mode and a normal plane image display mode in accordance with locations the viewers, and a lighting controller for designating to light the right and left light-cells so as to address lights spatially modulated by the first spatial modulator to the right eyes of the viewers and the other lights spatially modulated by the second spatial modulator to the left eyes of the viewers when the display mode changer selects the stereoscopic image display mode and to address the lights spatially modulated by either of the first and second spatial modulators to both the right and left eyes of the viewers when the display mode changers selects the normal plane image display mode.

Addition objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
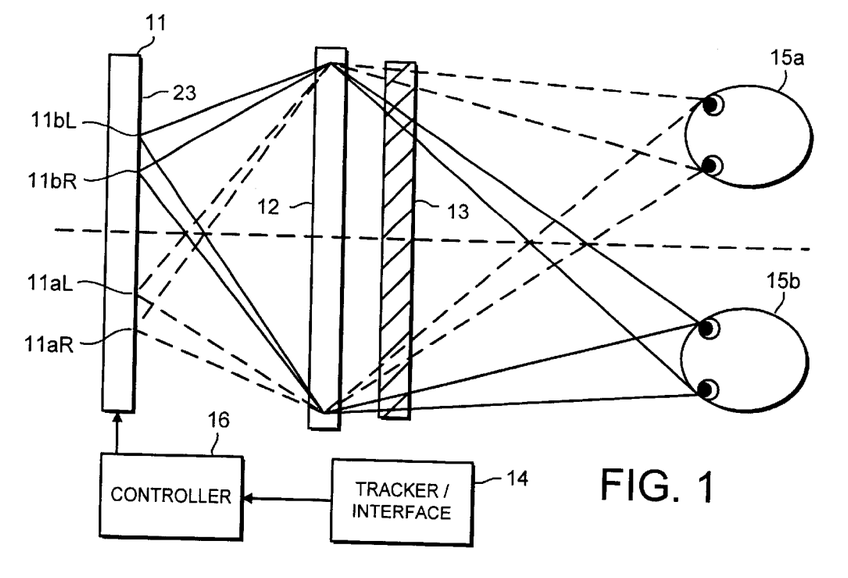
FIG. 1 is a schematic diagram showing a principal structure of the stereoscopic image display apparatus of the present invention.

Referring now to FIGS. 1 to 9, preferred embodiments of the present invention will be explained hereinafter. FIG. 1 is a diagram showing a basic configuration of the present invention. In FIG. 1, 11 denotes a light source which is able to provide shutter-cells 11aR, 11bR respectively associated with the right eyes of viewers 15a, 15b and shutter-cells 11aL, 11bL respectively associated with the left eyes of viewers 15a, 15b. The light source 11 can be achieved by providing a light source and an LCD shutter panel in front of the light source, wherein the shutter panel is able to control its light transmission and blocking positions, as will be described in detail in reference to FIG. 2 later.

Lights from the light source 11 pass through a convex lens 12 and then focuses on the right eyes and the left eyes of the viewers. The lights passing through the convex lens 12 again pass through an LCD spatial modulator 18. The LCD spatial modulator 13 displays an image associated with the viewer's right eye when the light source 11 emits lights associated with the right eyes, and it display the image associated with the viewer's left eye when the light source 11 emits lights associated with the left eyes.

In the drawing solid lines represent light paths for providing a stereoscopic view to the viewer 15b, while dotted lines represent light paths for providing a stereoscopic view to the viewer 15a.

A tracker/interface 14 determines the stereoscopic image display or the normal plane image display in accordance with the position of the viewer or his/her instruction. When the viewer 15a tilts his/her head, and then it is difficult to fuse the right and left stereoscopic images with each other or to provide the viewer 15a with a stereoscopic view, the tracker/interface 14 recognizes the condition and provides information as a result if the recognition to the controller 16. Then the controller 16 controls the light source 11 so as to designate shutter-cells for presenting the viewer 15a with a normal plane image display.

That is, it operates to provide the normal plane image display to the viewer 15a. There are a various ways of presenting such normal plane image display as described later.

Figure 2:
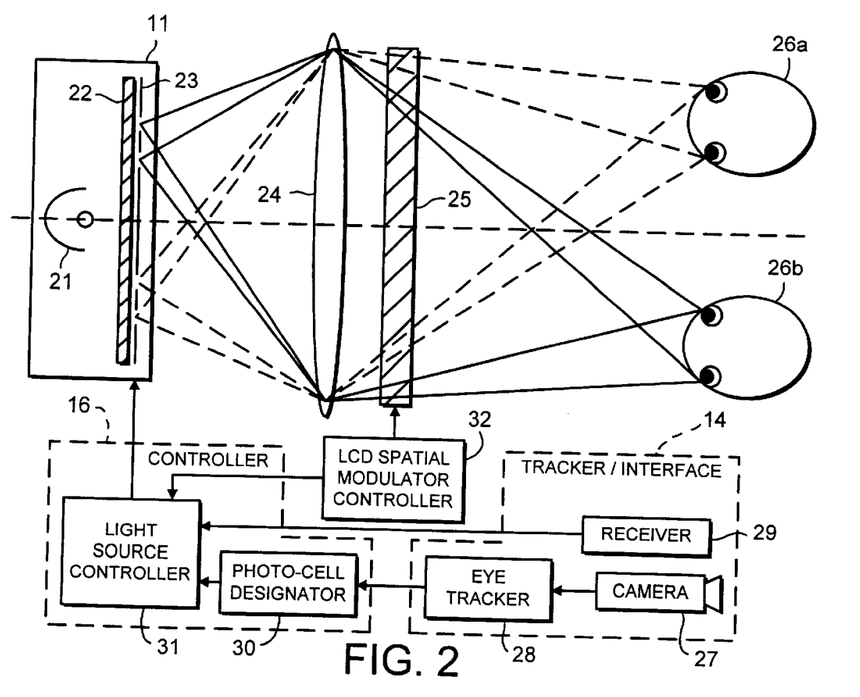
FIG. 2 is a schematic diagram showing one embodiment of the stereoscopic image display apparatus according to the present invention.

FIG. 2 is a diagram showing a preferred embodiment of the stereoscopic image display apparatus according to the present invention. The stereoscopic image display, as shown in FIG. 2, is characterized by that it is provided with an LCD spatial modulator 25 as the spatial modulator for alternatively displaying the right and the left images.

In the stereoscopic image display apparatus of the embodiment, as shown in FIG. 2, the optical source 11 is comprised of an optical source 21, a diffuser panel 22 and an LCD shutter panel 23. 24 denotes a convex lens, 25 denotes an LCD spatial modulator, and 26a and 26b denote viewers, respectively.

The tracker/interface 14 is comprised of a camera 27, an eye-tracker 28 and a receiver 29 for receiving a remote control signal from a remote controller 16 operable by the viewers. The controller 16 is comprised of a light-cell designator 30, and a light source controller 31. 32 is an LCD spatial modulator controller, which supplies the right image signal and the left image signal in turn to the LCD spatial modulator 25. The supply timing signal is applied also to the light source controller 31 of the controller 16.

The light from the light source 21 becomes the diffusion light thorough the diffuser panel 22 and input to the LCD shutter panel 23. On the LCD shutter panel 23, in FIGS. 4a and 4b shutter-cells 23aL, 23aR, 23bL and 23bR are defined. The shutter-cells 23aL 23aR are addressed to the viewer 26a, while the shutter-cells 23bL, 23bR are addressed to the viewer 26b. The shutter-cells are controlled by the light source controller 31, the diffusion light passes through the shutter-cells. The positions of the shutter-cells 23aL, 23aR, 23bL and 23bR are associated with the left and right eyes of the viewers 26a and 26b in a one-to-one relationship. When the number of the viewers changes, the designation of the shutter-cell associated with the viewer's eyes are controlled in accordance with the increase or decrease of the viewers.

The location information of the viewer is fed back as the position of the shutter-cell. In one embodiment, the eye-tracker 28 tracks the eye movement of the viewers based on the pictures of the viewers taken by camera 27. The eye-position information obtained by the eye-tracker 28 is transferred to the light-cell designator 30. The light-cell designator 30 sets up the position of the shutter-cell associated with the eyes of the viewer based on the eye-position information. The set up result is sent to the light pass/block controller 31. Accordingly, the shutter-cell position of the LCD shutter panel 23 is decided.

Then, the lights passing through the shutter-cells 23aL, 23aR, 23bL, and 23bR are focused around the eyes of the viewers 26a, 26b by the convex lens positioned between the convex lens 23 and the viewers 26a, 26b, is a LCD spatial modulator 25 for alternatively displaying the right and the left images which are output by the panel control apparatus 32, so that the viewers 26a, 26b can observe the stereoscopic image, i.e., the alternately displayed right and left images.

Figure 3A:
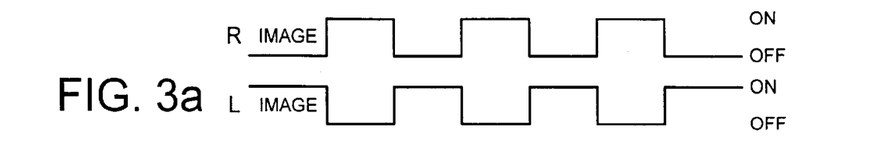
FIGS. 3a to 3c are timing charts showing the operations of the alternately displayed parallax images and the shutter operation in the stereoscopic image display apparatus, as shown in FIG. 1.
Figure 3B:
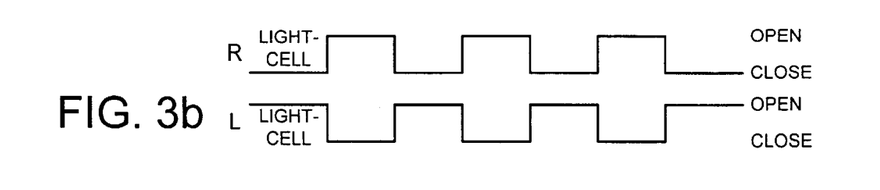

The control operation of the shutter-cells 23aL, 23aR for presenting the stereoscopic image to the viewer 26a (hereafter the operation will be referred to as a 3D mode operation ) will be explained in reference to FIGS. 2 and 3. FIG. 3a is a timing chart of the right and left images with a parallax therebetween, alternately projected on the LCD spatial modulator 25. FIG. 3b is a timing chart showing the open/close operation of the shutter-cell 23aL, 23aR associated with the right and left eyes in the 3D mode operation.

Figure 3C:
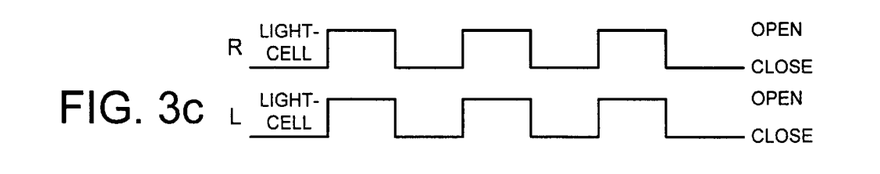

As seen from FIGS. 3a to 3c, when the image for right eye is displayed on the LCD spatial modulator 25, the shutter-cell 23aR associated with the right eye is activated while the shutter-cell 23aL associated wit the left eye is deactivated. When the image for the left eye is displayed on the LCD spatial modulator 25, the shutter-cell 23aR associated with the right eye is deactivated, while the shutter-cell 23aL associated with the left eye is activated. Accordingly, the viewer can observe the display image as the stereoscopic image by using parallax.

Now, the open/close operation of the shutter-cell in the normal plane image display mode (hereafter the operation will be referred to as a 2D mode operation) will be explained. FIG. 3c is timing chart showing the shutter-cell open/close operation in the 2D mode operation.

When the image for the right eye is displayed on the LCD spatial modulator 25, both the shutter-cells 23aL, 23aR associated with both right and left eyes are activated. When the image for left eye is displayed both the shutter-cells 23aL, 23aR associated with both right and left eyes are closed. Accordingly, the viewer observe the image for the right eye among the display images as the plane image.

The 3D and 2D mode operations are interchanged with each other in accordance with the condition of the viewer. For instance, when the viewer observing in the 3D mode operation tilts his/her head, a shutter cell which focuses the right image on the right eye and the left image on the left eye is selected. However, these image contains only the horizontal parallax information, so that it is hard to present the image stereoscopic. So, the light source controller 31 changes the mode from 3D to 2D automatically, when the viewer tilts his/her head more than the specific angle which is set up that the fusion of the parallax image is difficult, based on the result sent from the light-cell designator 30.

Further, even in the case that the viewer can observe the stereoscopic image in the 3D mode operation (the state that the parallax images can be fused) when the viewer wants to observe the plane image in accordance with his/her intention he/she can change the image display mode between the 3D and 2D mode operations at his/her pleasure by sending the signal received in the receiver 29 to the light pass/block controller 31 by the radio such as the remote controller. Here, this is not limited to the radio, but other external input system may be adapted.

Furthermore, according to the present invention, the position, the size of the shutter and the timing of the open/close operation are controlled separately. That is, when several viewers observe it, the shutters associated with their eyes are controlled separately.

In the stereoscopic image display apparatus according to the present invention, the same image can be provided in the 3D mode operation to some viewers and in the 2D mode operation to some viewers having some reasons as described above in one display apparatus.

Figure 4A:
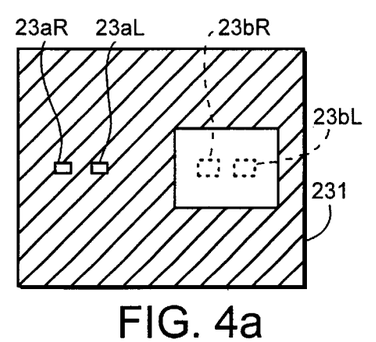
FIGS. 4a and 4b are diagrams showing examples of the position and the size of the shutter-cells in the present invention.

Further, according to the present invention, the shutter-cells 23bL, 23bR operated in the 2D mode operation explained in FIG. 2 may be set up as a region 231 including these two shutter-cells. In this case, since it can take wide margin, the viewer can observe the fine normal plane image display even when the viewer moves fast and the movement of the shutter does not catch up. That is, it controls to simultaneously open the left and right shutter-cells, as shown in FIG. 3c. This is advantageous since it is not needed to often control the shutter-cells when the viewer moves if a wide region like the region 231 is defined in place of the shutter-cells 23bL, 23bR.

Figure 4B:
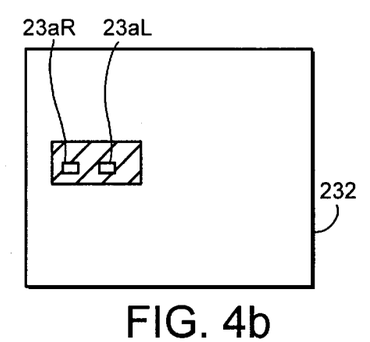

Further, as shown in FIG. 4b, when a region 232 operative in the 2D mode operation is defined in covering all the shutter-cells other than those operating in the 3D mode operation, the normal plane image display can be observed by any viewers. That is when a small hatched region, as shown in FIG. 4b, is defined, only the viewer associated with the shutter-cells 23aL, 23aR can observe the image in the 3D mode operation, while other viewers can observe the image in the 2D mode operation in any location or posture of the viewers.

Here, the shutter-cells associated with the eyes of the viewers are explained in the four shutter-cells, that is, shutter-cells addressed to two viewers. However, the number of viewers is not limited. Also the number of the shutter-cells is not limited.

Figure 5:
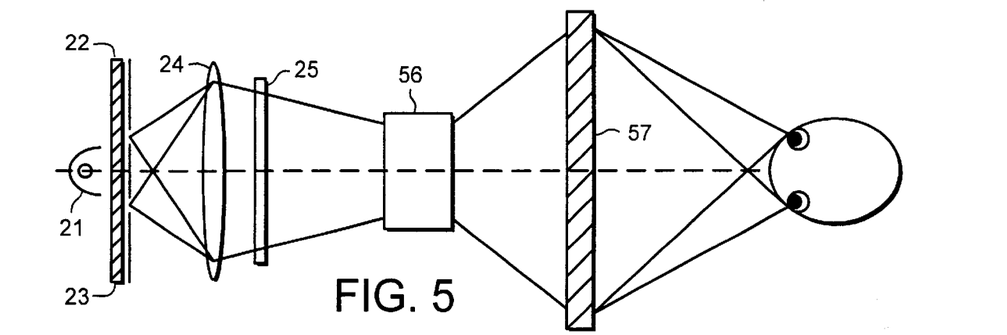
FIG. 5 is a schematic diagram showing another embodiment of the stereoscopic image display apparatus according to the present invention.

Further, the convex lens 24, as shown in the FIG. 2, serves to focus the light from the light source onto the eyes of the viewers. Then the convex lens 24 may be replaced by any other optical system containing several lenses. For example, as shown in FIG. 5, such an optical system may be comprised of the convex lens 24, the LCD spatial modulator 25 and a projection lens 56 for projecting lights to the convex Fresnel lens 57 in a shape of a light transmission screen. In this case, the image is enlarged to the whole area of the Fresnel lens 57. Thus viewers can enjoy a wide screen image. As described above, the optical system is not limited to the single convex lens system.

Figure 6:
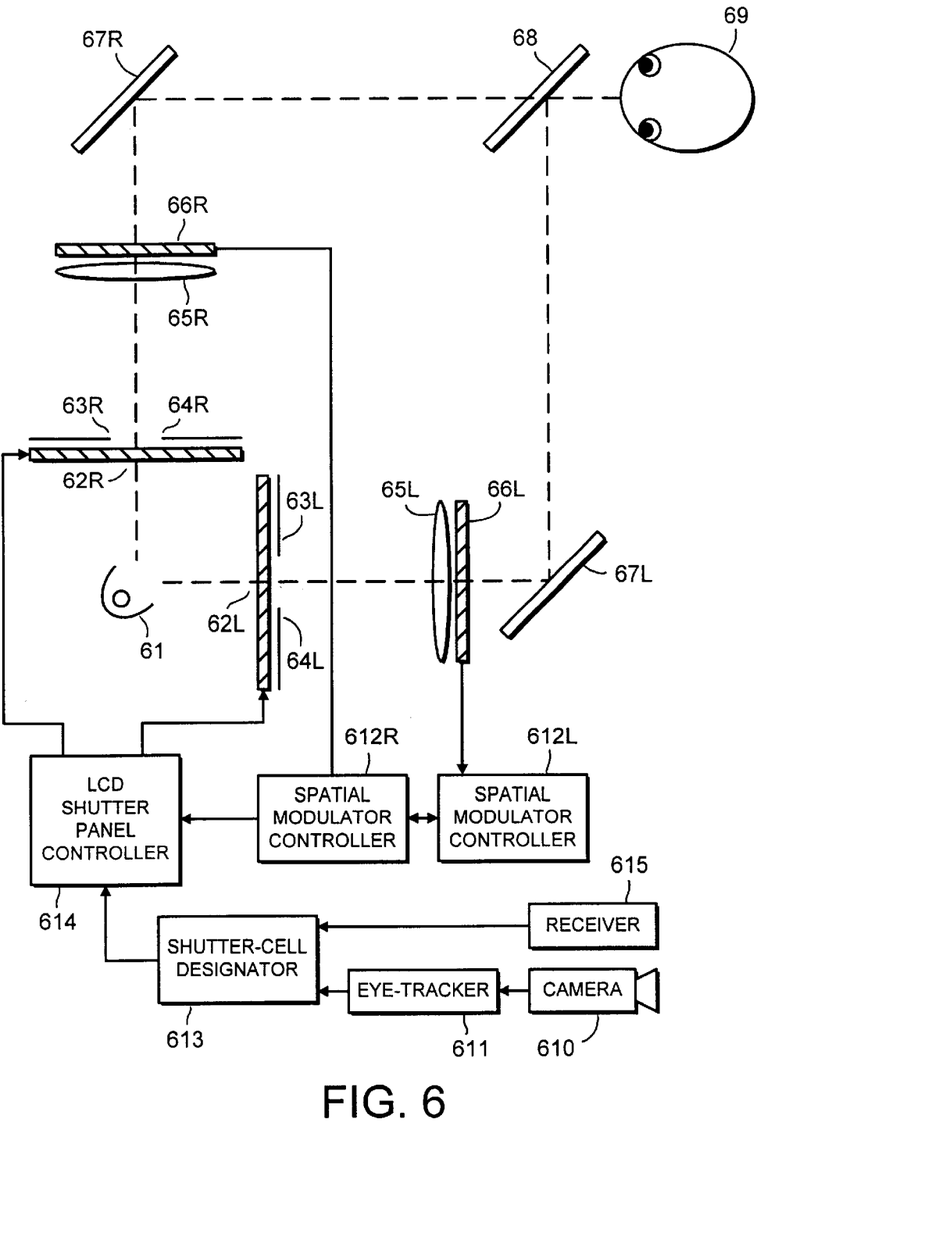
FIG. 6 is a schematic diagram showing still another embodiment of the stereoscopic image display apparatus according to the present invention.

FIG. 6 shows a second preferred embodiment of the present invention.

A stereoscopic image display apparatus, as shown in FIG. 6, is characterized by that it is provided with an LCD spatial modulator 66R for displaying the right image, and the LCD spatial modulator 66L for displaying the left image.

The light from the light source 61 is diffused by diffuser panels 62R, 62L, and incidents to the LCD shutter panels 63R, 63L. On either LCD shutter panels 63R, 63L, the shutter-cells 64R, 64L are designated. The designation is carried out by the LCD shutter panel controller 614. The diffusion light passes through these shutter-cells.

Here the positions of the shutter-cells 64R, 64L are respectively associated with left and right eyes of the viewer 69 in a one-to-one relationship. In the same manner as the above-described first embodiment, the positions of the shutter-cells are controlled by feeding back information of the location of the viewer. That is, an eye-tracker 611 tracks movements of eyes of the viewers based on pictures of the viewers captured by a camera 610. The shutter-cell designator 613 designates the shutter-cells associated with the eyes of the viewer in reference to the eye-position information. Then the LCD shutter panel controller 614 drives the shutter-cells designated by the shutter-cell designator 613.

The light passing through the shutter-cells 64R, 64L are condensed by convex lenses 65R, 65L, reflected by reflectors 67R, 67L, combined by a semi-transparent mirror 68, then focuses around the eyes of the viewer 69.

Between the convex lenses 65R, 65L and the viewer 69, there is located LCD spatial modulators 66R, 66L for showing the right eye parallax image and the left eye parallax image under the control of spatial modulator controllers 612R, 612L. According to the above configuration a viewer 69 can observe the display image.

The operations of the LCD shutter panels 63R, 63L in the 3D mode operation for presenting a stereoscopic image to the viewer 69 will be explained in reference to FIGS. 6 and 7.

Figure 7A:
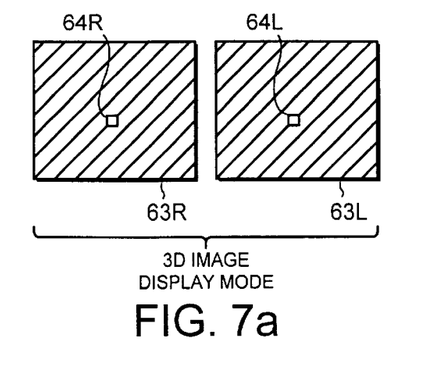
FIGS. 7a and 7b are diagrams showing exemplified positions of the shutter-cells designated on the shutter panel in the stereoscopic image display apparatus, as shown in FIG. 6.

FIG. 7a shows appearances of the LCD shutter panels 63R, 63L in the 3D mode operation.

On the LCD shutter panel 63R the shutter-cells 64 associated with the right eye of the viewer is activated. The light passing through the shutter-cells 64R is modulated by the LCD spatial modulator 66R in a state presenting the right image and then focused on the right eye of the viewer 69. On the LCD shutter panel 63L the shutter-cells 64L associated with the left eye of the viewer is activated. The light after passing through the shutter-cells 64L is modulated by the LCD spatial modulator 66L in the state presenting the left image and then focused on the left eye of the viewer. According to the operation, the viewer can observe the stereoscopic image.

Next, the operations of the LCD shutter panel 63R, 63L for presenting a normal plane image to the viewer will be explained in reference to FIG. 7b. FIG. 7b shows appearances of the LCD shutter panels 63R, 63L in the 2D mode operation.

On the LCD spatial modulator 63R the shutter-cells 64R associated with the right eye of the viewer and the shutter-cells 64L associated with the left eye of the viewer are activated. The light after passing through the shutter is modulated by the LCD spatial modulator 66R in the state displaying the right image, and then focused on both the right and left eyes of the viewer. On the LCD 63L shutter panel, the shutter-cells associated with both eyes of the viewer are deactivated. Of if they are activated, the light passing through them fails to reach the eyes of the viewer. According to the above operation, the viewer 69 can receive only the image associated with his/her right eye and thus observes a normal plane image.

In the same manner as the embodiment as described above in the 3D and 2D mode operations, even when the viewer observing the image in the 3D mode operation tilts his/her head more than the specific angle which is hard to fuse the parallax image, the LCD shutter panel controller 614 changes the image display mode from the 3D mode operation to the 2D mode operation automatically based on the designation by the shutter-cell designator 613.

Even when the viewer can observe the stereoscopic image in the 3D mode operation, i.e., in the condition that the parallax image is hard to be fused together, the viewer can change the image display mode from the 3D mode operation to the 2D mode operation at his/her pleasure through the interface such as the receiver 615 for receiving the remote control signal from the remote controller operable by the viewer to the shutter-cell designator 613. Here the interface can be realized by any external input system, other than such a remote control system.

Figure 7B:
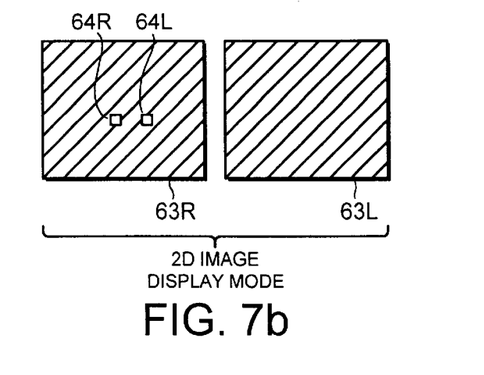
Figure 8A:
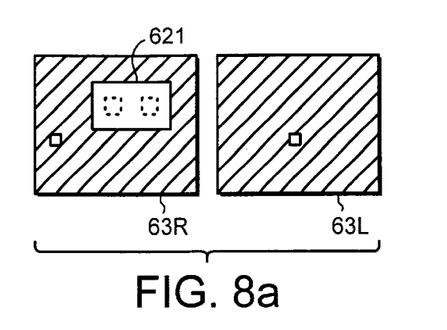
FIGS. 8a and 8b are diagrams showing other examples of the position of the shutter-cells on the shutter panel in the stereoscopic image display apparatus, as shown in FIG. 6.

Further, according to the present invention, the shutter-cells 64R, 64L operating in the 2D mode operation, as shown in FIG. 7b, may be replaced by a region 621 including these two shutter-cells, as shown in FIG. 8a. In this case, it can take a wide margin like the first embodiment. Thus the viewer can observe a good quality of the normal plane image display.

Figure 8B:
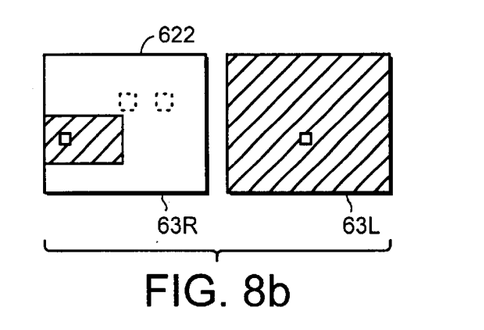

As shown in FIG. 8b, by defining a region 622 operating in the 2D mode operation the normal plane image display can be observed by many viewers.

Here the shutter-cells associated with the eyes of the viewer have been explained as two shutter-cells, that is, the case addressed the single viewer. However, the number of viewers, and the number of shutter-cells are not limited.

The convex lens 65, as shown in FIG. 6, serves to focus the light from the light source on the eyes of the viewers. Such a lens system may be replaced with any other optical system containing a plurality of lenses, and thus not limited to the type of one convex lens.

Here, the image presented in the 2D mode operation has been explained as the right image. However, it may not be limited to the light for the right eye but may be adapted to the left eye. Though the right image or the left image is selected by the viewer, in the case that the image signal is recorded at the compression rates different between the right and left images, the image having the lower compression rate will be automatically selected.

Figure 9A:
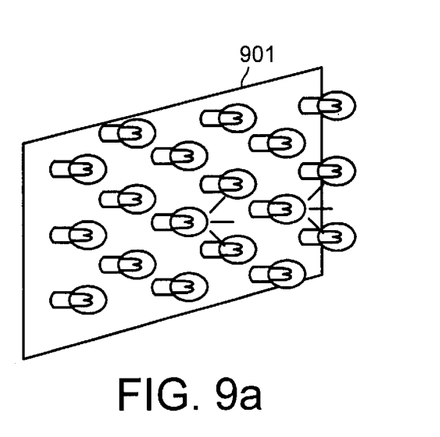
FIGS. 9a and 9b are diagrams showing other examples of the light sources equivalent in their operation with the light source, the diffuser panel and the shutter panel according to the present invention.
Figure 9B:
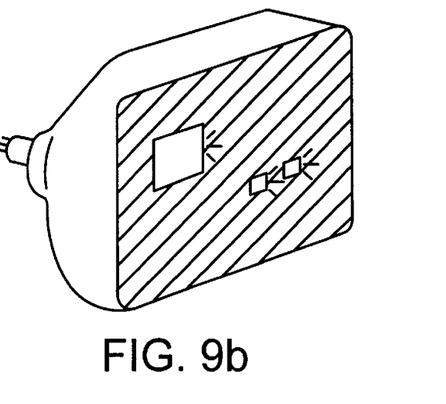

Furthermore, the light source 21, the diffuse panel 22, and the LCD shutter panel 23, as shown in FIG. 2, or the light source 61, the diffuse panel 62R and the LCD shutter panel 63R and the light source 61, the diffuse panel 62L and LCD shutter panel 63L, as shown in FIG. 6, may be replaced with a light source 901 with a two-dimensional configuration including a plurality of light cells. It is also possible to use a monochromic cathode-ray tube 902, as shown in FIG. 9b. Thus it is not limited by the embodiments as described above.

As described above, the present invention can provide a stereoscopic image display capable of presenting both the stereoscopic image display and the normal plane image display or capable of changing between the stereoscopic image display and the normal plane image display in accordance with situations of viewers. So, in the case that the viewer tilts his/her head or the parallax images are hard to be fused together into a stereoscopic image, the viewer can still observe the plane image by changing from the stereoscopic image display. Further, even in the case when the viewer is hard to observe the stereoscopic image due to a fatigue in his/her eyes, the normal plane image display is changed from the stereoscopic image display so as to avoid the burden to his/her eyes.

As described above, the present invention can provide an extremely preferable stereoscopic image display apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The face that the applicant has chosen at the time of filing of the present application to restrict the claimed scope of the protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A stereoscopic image display apparatus, comprising:
   a light source having right and left shutter-cells for providing plural pairs of right and left lights to project right and left images, respectively;
   a spatial modulator spaced apart from the light source for spatially modulating said plural pairs of right and left lights from said light source so as to provide said right and left images on the eyes of at least one viewer;
   a display mode changer, coupled to and controlling said light source, for changing a display mode between a stereoscopic image display mode and a normal plane image display mode in accordance with a location of said at least one viewer; and
   a lighting controller located within said display mode changer for controlling said right and left shutter-cells;
   wherein said light controller alternately activates said right and left shutter-cells to alternately project said right and left lights to said spatial modulator when said display mode is selected to operate in said stereoscopic image display mode; and
   wherein said light controller simultaneously activates all right and left shutter-cells in synchronization with the projection of said right or left lights, respectively, to said spatial modulator when said display mode is selected to operate in said normal plane image display mode.

2. A stereoscopic image display apparatus, comprising:
   a light source having right and left shutter-cells for providing plural pairs of right and left lights to project right and left images, respectively;
   a spatial modulator spaced apart from said light source for spatially modulating said plural pairs of right and left lights from said light source so as to provide said right and left images on the eyes of at least one viewer;
   a display mode changer, coupled to and controlling said light source, for changing a display mode between a stereoscopic image display mode and a normal plane image display mode in accordance with instructions received from said at least one viewer; and
   a lighting controller located within said display mode changer for controlling said right and left shutter-cells;
   wherein said light controller alternately activates said right and left shutter-cells to alternately project said right and left lights to said spatial modulator when said display mode is selected to operate in said stereoscopic image display mode; and
   wherein said light controller simultaneously activates all right and left shutter-cells in synchronization with the projection of said right or left lights, respectively, to said spatial modulator when said display mode is selected to operate in said normal plane image display mode.

3. A stereoscopic image display apparatus according to claim 1 or 2, wherein said lighting controller controls said light source to illuminate a region containing both said right and left shutter-cells in said normal plane image display mode to display one of said right and left images.

4. A stereoscopic image display apparatus as claimed in claim 3,
   at least one or more viewers viewing said right and left images in said normal plane image display;
   at least one or more viewers viewing said right and left images in said stereoscopic image display mode;
   at least one of said right or left shutter panel defining a first region for positioning said shutter cells associated with displaying said right and left images in said normal plane image display mode; and
   at least one of said right or left shutter panel defining a second region for position said shutter cells associated with displaying said right and left images in said stereoscopic image display mode so that first region and the second region do not overlap.

5. A stereoscopic image display apparatus, comprising:
   a light source projecting a right light and a left light to provide a right image and a left image, respectively;
   a right shutter panel having a right and left shutter-cells for receiving said right light projected from said light source and for providing plural pairs of lights to project said right image;
   a left-shutter panel having a right and left shutter-cells for receiving said left light projected from said light source and for providing plural pairs of lights to project said left image;
   a first spatial modulator spaced apart from the light source for spatially modulating said right light from said right shutter panel so as to provide said right image on the right eye of at least one viewer;
   a second spatial modulator spaced apart from the light source for spatially modulating said left light from said left shutter panel so as to provide said left image on the left eye of at least one viewer;
   a display mode changer, coupled to and controlling said light source, for changing a display mode between a stereoscopic image display mode and a normal plane image display mode in accordance with a location of said at least one viewer; and
   a lighting controller located within said display mode changer for designating light to said right and left shutter-cells located in the right shutter panel and the left shutter panel; and
   wherein said light controller alternately activates said right and left shutter-cells of said right and left shutter panels in synchronization when said display mode is selected to operate in said stereoscopic image display mode; and
   wherein said light controller simultaneously activates said right and left shutter-cell of said right shutter panel and simultaneously activates the right and left shutter-cells of the left shutter panel alternately when said display mode is selected to operate in said normal plane image display mode.

6. A stereoscopic image display apparatus, comprising:

a light source projecting a right light and a left light to provide a right image and a left image, respectively;

a right shutter panel having a right and left shutter-cells for receiving said right light projected from said light source and for providing plural pairs of lights to project said right image;

a left shutter panel having a right and left shutter-cells receiving said left light projected from said light source and for providing plural pairs of lights to project said left image;

a first spatial modulator spaced apart from the light source for spatially modulating said right light from said right shutter panel so as to provide said right image on the right eye of at least one viewer;

a second spatial modulator spaced apart from the light source for spatially modulating said left light from said left shutter panel so as to provide said left image on the left eye of at least one viewer;

a display mode changer, coupled to and controlling said light source, for changing a display mode between a stereoscopic image display mode and a normal plane image display mode in accordance with instructions received from said at least one viewer; and a lighting controller located within said display mode changer for designating light to said right and left shutter-cells located in the right shutter panel and the left shutter panel; and wherein said light controller alternately activates said right and left shutter-cells of said right and left shutter panels in synchronization when said display mode is selected to operate in said stereoscopic image display mode; and wherein said light controller simultaneously activates said right and left shutter-cells of said right shutter panel and simultaneously activates the right and left shutter-cells of the left shutter panel alternately when said display mode is selected to operate in said normal plane image display mode.

7. A stereoscopic image display apparatus according to claim 5 or 6, wherein said lighting controller controls said light source to illuminate a region containing both said right and left shutter-cells in said normal plane image display mode to display one of right and left images so as to project the lights spatially modulated by one of said first and second spatial modulators on both the right and left eyes of said at least one viewer.

8. A stereoscopic image display apparatus as claimed in claim 7, at least one or more viewers viewing said right and left images in said normal plane image display;

at least one or more viewers viewing said right and left images in said stereoscopic image display mode;

at least one of said right or left shutter panel defining a first region for positioning said shutter cells associated with displaying said right and left images in said normal plane image display mode; and at least one of said right or left shutter panel defining a second region for position said shutter cells associated with displaying said right and left images in said stereoscopic image display mode so that first region and the second region do not overlap.

9. A stereoscopic image display apparatus as in claim 1,2,5 or 6, wherein said display mode changer changes said display mode to said normal plane image display mode when alignment of both the right and left eyes of said at least one viewer has tilted from an image display screen more than a specific angle.

10. A stereoscopic image display apparatus, comprising:

a light source having right and left shutter-cells for providing plural pairs of right and left lights to project right and left images, respectively;

a spatial modulator spaced apart from the light source for spatially modulating said plural pairs of right and left lights from said light source so as to provide said right and left images on the eyes of at least one viewer;

a display mode changer, having a tracker mechanism and a controller interface therein, said tracker mechanism connected to said controller interface for determining a location of said at least one viewer, said controller interface being connected to said light source and said spatial modulator for controlling said light source so as to adjust the position of said right and left shutter-cells, for changing a display mode between a stereoscopic image display mode and a normal plane image display mode in accordance with a location of said at least one viewer; and a light controller located within said display mode changer for controlling said right and left shutter-cells;

wherein said light controller alternately activates said right and left shutter-cells to alternately project said right and left lights to said spatial modulator when said display mode is selected to operate in said stereoscopic image display mode; and wherein said light controller simultaneously activates all right and left shutter-cells in synchronization with the projection of said right or left lights, respectively, to said spatial modulator when said display mode is selected to operate in said normal plane image display mode.

11. A stereoscopic image display apparatus, comprising:

a light source having right and left shutter-cells for providing plural pairs of right and left lights to project right and left images, respectively;

a spatial modulator spaced apart from the light source for spatially modulating said plural pairs of right and left lights from said light source so as to provide said right and left images on the eyes of at least one viewer;

a display mode changer, having a tracker mechanism and a controller interface therein, said tracker mechanism connected to said controller interface for determining a location of said at least one viewer, said controller interface being connected to said light source and said spatial modulator for controlling said light source so as to adjust the position of said right and left shutter-cells, for changing a display mode between a stereoscopic image display mode and a normal plane image display mode in accordance with instructions received from said at least one viewer; and a light controller located within said display mode changer for controlling said right and left shutter-cells;

wherein said light controller alternately activates said right and left shutter-cells to alternately project said right and left lights to said spatial modulator when said display mode is selected to operate in said stereoscopic image display mode; and wherein said light controller simultaneously activates all right and left shutter-cells in synchronization with the projection of said right or left lights, respectively, to said spatial modulator when said display mode is selected to operate in said normal plane image display mode.

* * * * *